June 16, 1959  J. L. GOTTLIEB  2,890,730
MULTIPLE BORING MACHINES
Filed Dec. 23, 1955  5 Sheets-Sheet 1
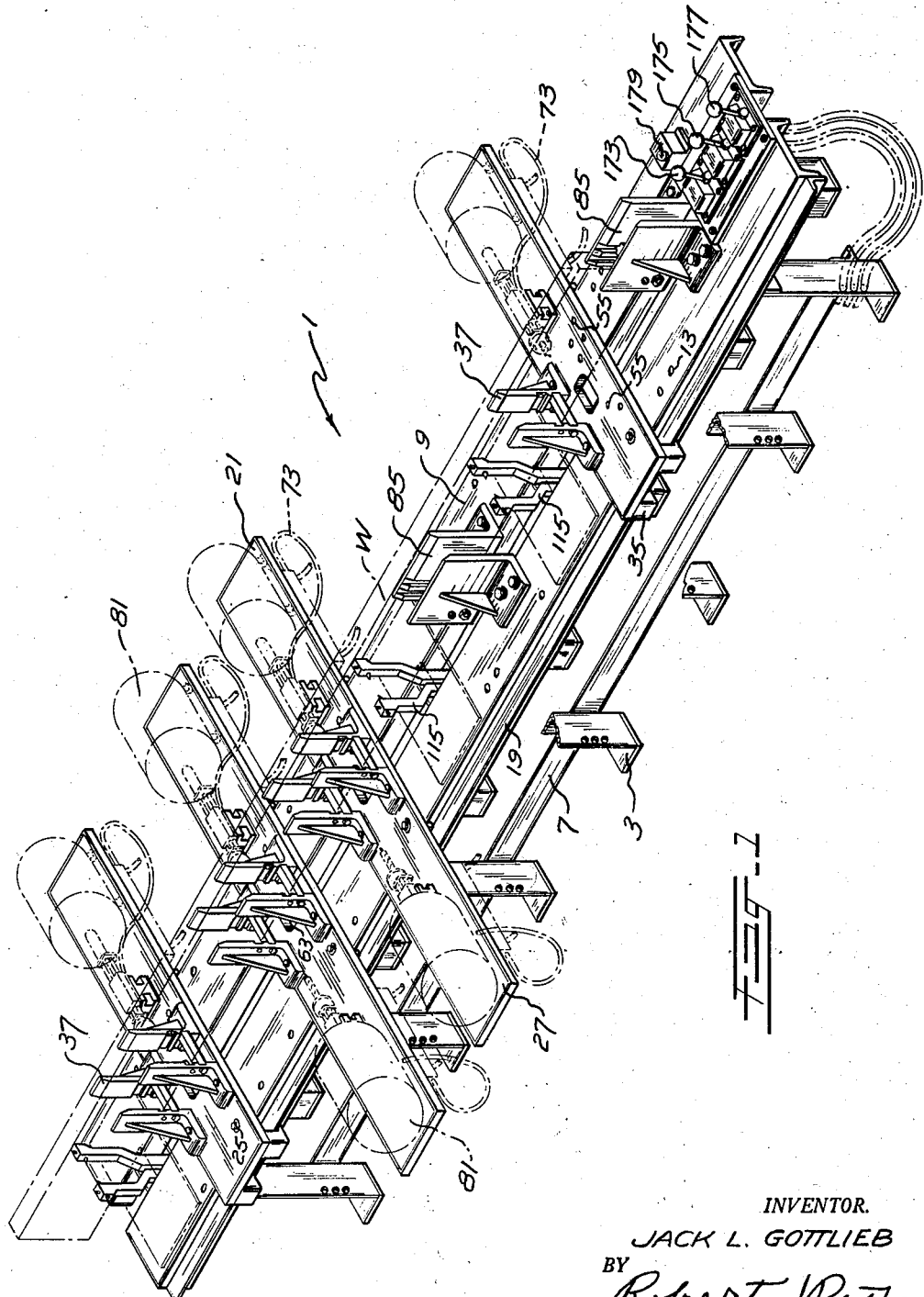
INVENTOR.
JACK L. GOTTLIEB
BY
Robert J Patin

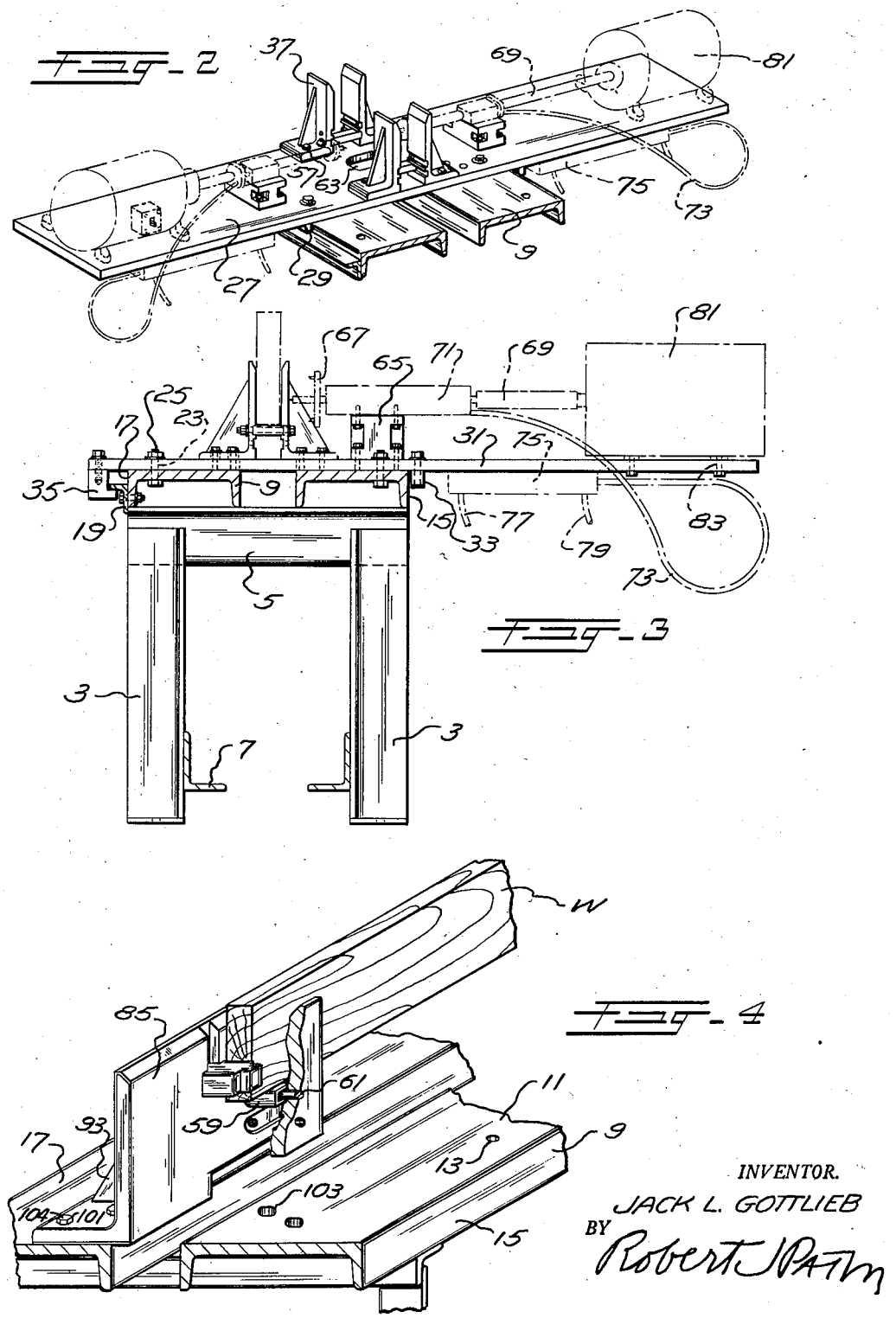

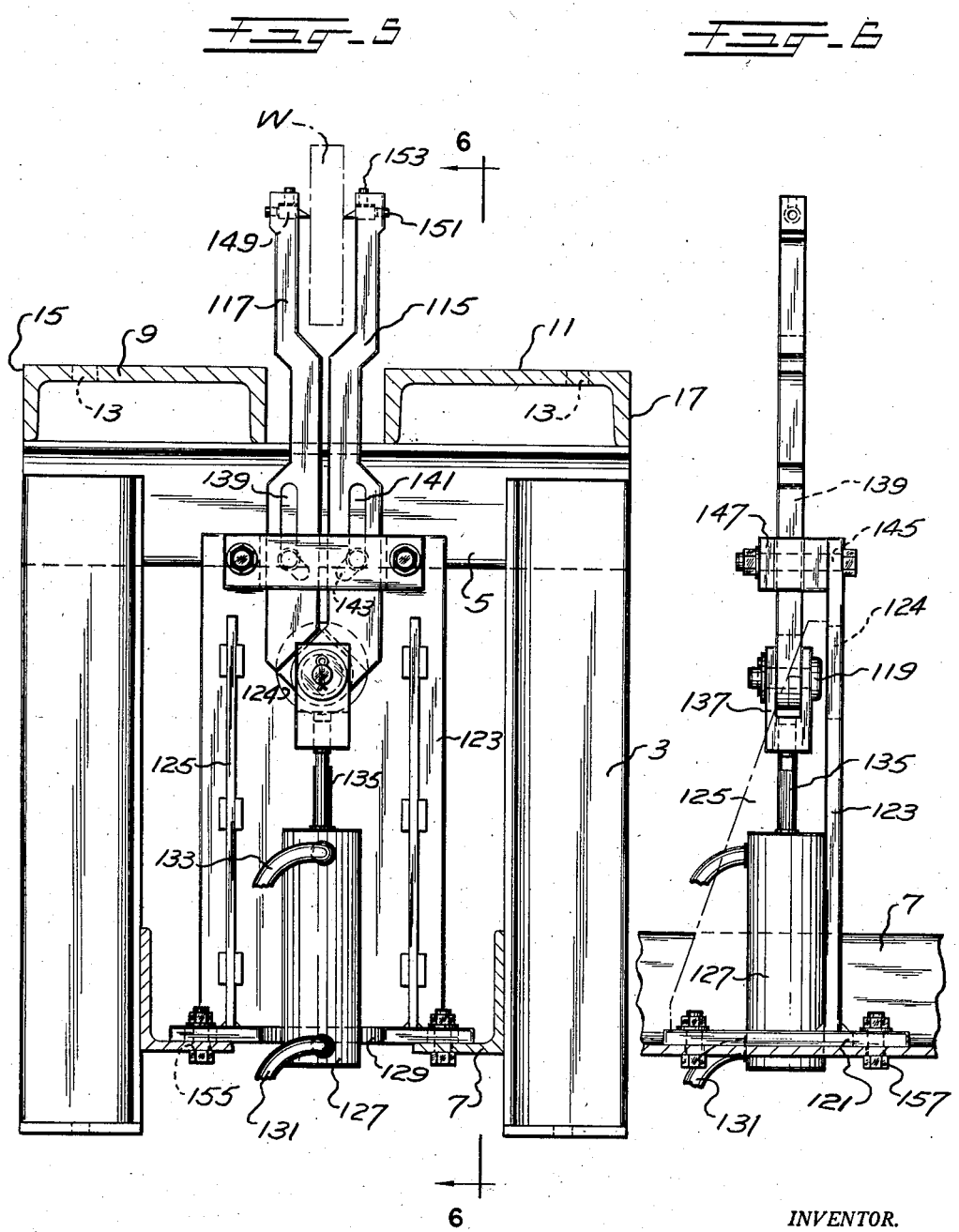

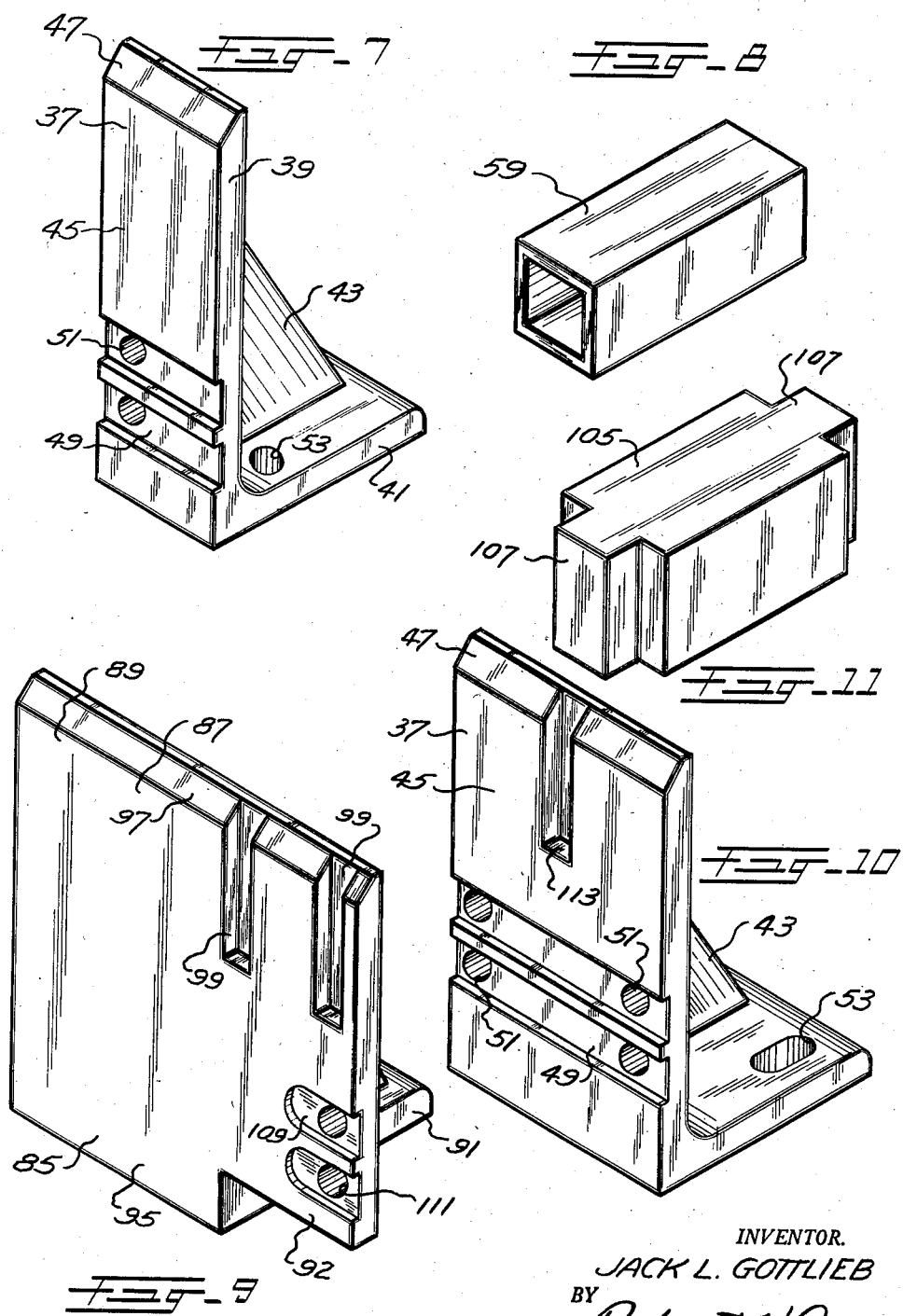

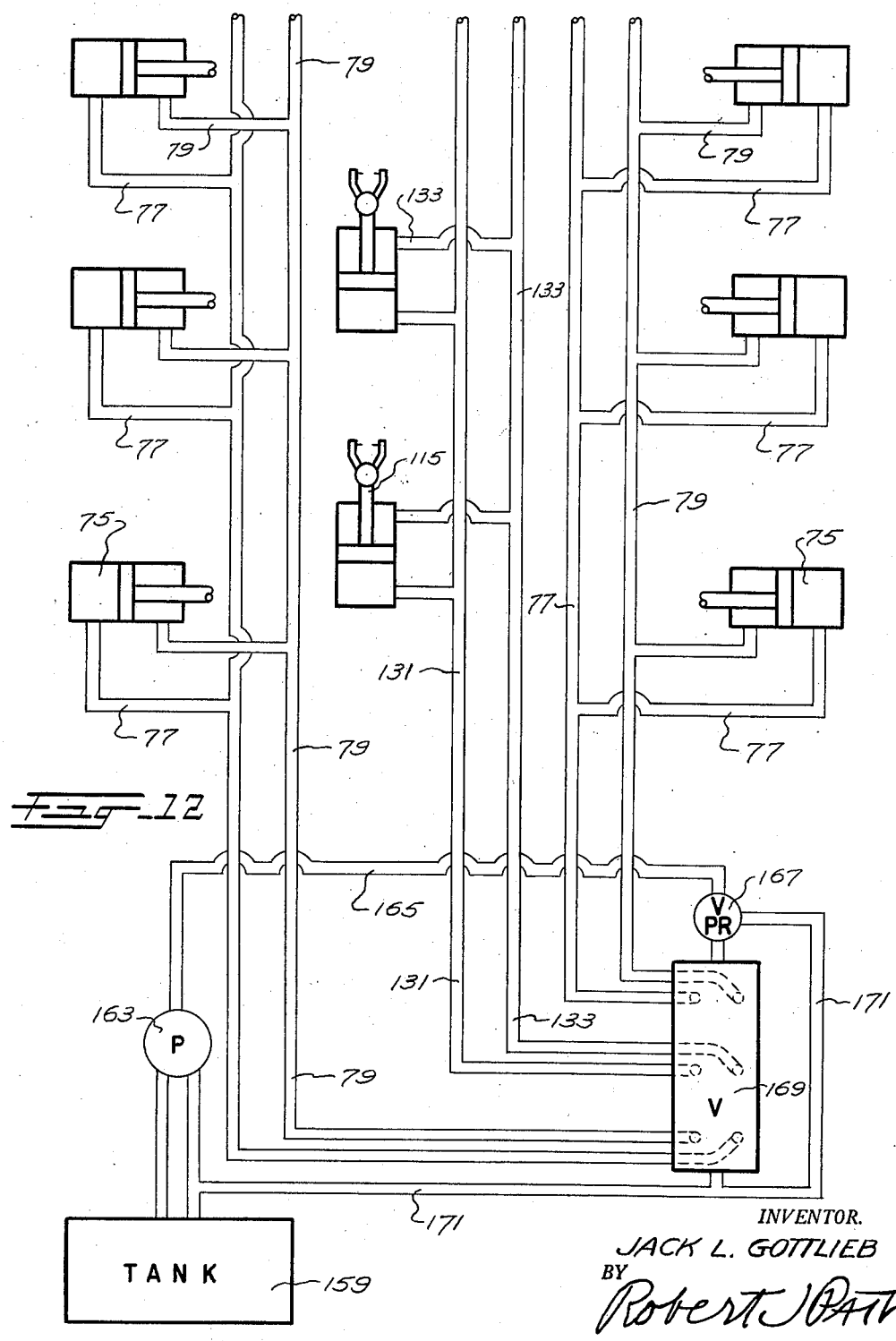

United States Patent Office 2,890,730
Patented June 16, 1959

2,890,730

MULTIPLE BORING MACHINES

Jack L. Gottlieb, Silver Spring, Md.

Application December 23, 1955, Serial No. 555,125

23 Claims. (Cl. 144—112)

The present invention relates to woodworking machines, and more particularly to horizontal multiple boring machines.

Heretofore, the woodworking arts have encountered great difficulty in performing multiple work operations on a wooden work piece. For example, in modern day construction, it is common to employ composite trusses made up of a plurality of members held in side-by-side relationship. Each such individual member is provided with a plurality of holes through which bolts are passed and secured to maintain the truss in assembled relationship. An annular groove is recessed about each hole on each side of each interior member and on the inner sides only of the two outer members of the truss assembly. A split ring connector is then fitted into each pair of adjacent grooves to maintain the individual members against relative movement, and, most important of all, to distribute the bolt stresses over a wider area.

Until the advent of the present invention, the manufacture of such individual members for use in composite trusses was a slow and consequently expensive procedure. According to the practice of the prior art, the workman would mark the location of the holes on the wooden work piece and then place the work piece flat on a horizontal table beneath an overhead boring or boring and routing machine. The boring head was brought down close to the work piece and the work piece accurately positioned so that the hole would be bored true. After all the holes were bored or bored and routed in this manner, the work piece would be turned over and the same operation repeated on the other side so that the holes would be smooth and the grooves routed on the other side. Needless to say, these operations required skilled workmanship and were extremely time consuming; and hence, work pieces produced in this manner were quite expensive.

Not only in the manufacture of individual elements for composite trusses, but also in a variety of other woodworking operations, it is necessary to perform one or a plurality of work operations on a wooden work piece by means of a woodworking machine having a rotary tool or work head. Hence, although the present invention will be described particularly in connection with boring and routing operations, and although the drawings illustrate by way of example operations involving a combined boring and routing head, it is to be understood that the term "boring" as used in this specification means any analogous work operation performed on a wooden work piece by a machine tool having a rotary work head for the purpose of removing wood from the work piece. Similarly, the term "woodworking device" as used in this specification means any woodworking machine designed to perform such an operation.

Although many attempts were made to overcome the foregoing difficulties and other disadvantages of prior art machines, none, so far as I am aware, was completely successful when carried into practice on an industrial scale.

Accordingly, it is an object of my invention to provide an improved multiple boring machine.

Another object of my invention is the provision of a horizontal wood boring machine adapted to support a plurality of wood boring devices movable in parallelism thereon.

A still further object of my invention comprises the provision of a woodworking machine having novel means for positioning a wooden work piece thereon.

The invention also contemplates a woodworking machine having novel end stop means adapted to co-act with the end of a wooden work piece to position the work piece accurately on the machine.

It is also an object of my invention to provide a woodworking machine having novel hold-down means enabling the positioning of the work piece on edge and providing for removal of the "crown" of the work piece during the work operation.

Still another object of my invention is the provision of a woodworking machine having a novel supporting bed.

A still further object of my invention is the provision of a woodworking machine having novel means for adjustably positioning at least one woodworking device thereon.

Yet another object of the invention is the provision of a woodworking machine having a plurality of woodworking devices associated therewith and having control means selectively actuable to enable performance of the same or different work operations on a plurality of work pieces simultaneously.

It is also an object of my invention to provide a woodworking machine of which the various components are actuated by fluid pressure means controlled from a common control station.

Finally, it is an object of my invention to provide a woodworking machine which will be relatively simple and inexpensive to manufacture; easy to install, service and maintain; rapidly operable with greatly increased production; operable by relatively unskilled labor; and flexible in operation and rugged and durable in use.

Other objects and advantages will become apparent from a consideration of the following description taken in conjunction with the accompanying drawings, in which:

Figure 1 is a perspective view of a multiple boring machine according to my invention, with parts broken away and parts shown in phantom line for clarity;

Figure 2 is an enlarged perspective view of a portion of the invention shown in Figure 1 illustrating particularly one embodiment of supporting plate assembly;

Figure 3 is an elevational cross-sectional view of the device shown in Figure 1, illustrating particularly another embodiment of supporting plate assembly;

Figure 4 is a perspective view of a portion of the invention, with parts broken away, illustrating particularly the end stop means;

Figure 5 is an elevational cross-sectional view of the invention, with parts omitted for clarity, showing particularly the novel hold-down means;

Figure 6 is an elevational cross-sectional view, with parts omitted for clarity, taken on the line 6—6 of Figure 5;

Figure 7 is a perspective view of a guide member according to the invention;

Figure 8 is a perspective view of a supporting element according to the invention;

Figure 9 is a perspective view of one of the upright members of the end stop means;

Figure 10 is a modified form of the guide member shown in Figure 7;

Figure 11 is a perspective view of an end stop block; and

Figure 12 is a schematic circuit diagram showing the fluid pressure circuit of my invention.

Referring now to the drawings in greater detail, I have shown in Figure 1 a horizontal woodworking machine of the multiple boring type indicated generally at 1 and comprising a plurality of uprights 3 adapted to rest on the floor at their lower ends and at their upper ends to carry a cross-piece 5 between each pair of uprights 3. Uprights 3 carry, adjacent their lower ends and on the inner sides thereof, a pair of opposed, inwardly opening angles 7, one on each lateral side of the machine and extending substantially full length of the machine. Mounted on cross-pieces 5 is a supporting bed for supporting the operative parts of the machine and comprising a pair of elongated, parallel, spaced-apart, horizontal supporting members 9, each in the form of a downwardly opening channel member, the upper surfaces 11 of which are flat and horizontal and disposed in a common horizontal plane. Each supporting member 9 is provided along its length with a line of holes 13 which are spaced apart predetermined distances to permit the performance of work operations in any of a variety of selected positions along the length of the machine, as will be explained more fully hereinafter. Supporting members 9 terminate laterally outwardly in outer edges 15 and 17, one on each side of the supporting bed; and along the length of outer edge 17 is fixed an outwardly opening angle 19 for a purpose to be described later.

A plurality of elongated, horizontal supporting plates 21 having flat, horizontal upper surfaces are mounted transversely on supporting members 9 for sliding movement longitudinally thereof. Each supporting plate 21 slides on upper surfaces 11 of both supporting members 9 and is provided with a plurality of holes 23, at least one disposed above each side of the supporting bed comprising supporting members 9. Holes 23 are adapted for registry with and above corresponding holes 13; and locking means for securing supporting plates 21 in any of a plurality of positions of adjustment longitudinally of supporting members 9 are provided, comprising a plurality of locking elements in the form of screw-threaded bolts 25 adapted to extend through holes 23 and through any of holes 13 according to the desired position of supporting plates 21 along supporting members 9.

Supporting plates 21 may take either of two forms. The first form comprises a double supporting plate best shown in Figure 2, in which supporting plate 27 is seen to extend outward a substantial distance beyond the outer edges 15 and 17 of supporting members 9 on both sides of the supporting bed. The purpose of this arrangement is to provide balanced support for an opposed, inwardly directed pair of woodworking devices, one engageable from each side of the work piece W. For the purpose of guiding supporting plates 27 on the supporting bed, a pair of guide bars 29 is fixed to the lower surface of each supporting plate 27 transversely of the plate and spaced apart slightly greater than the distance between outer edges 15 and 17 of the supporting bed. By this means, supporting plates 27 are maintained slidable precisely longitudinally of supporting members 9, with their lengths maintained precisely perpendicular to the length of the machine as a whole.

The second embodiment of supporting plates comprises single supporting plates 31, as best seen by comparison of Figures 1 and 3. Single supporting plates 31 are also slidably carried on both upper surfaces 11 of supporting members 9 and are elongated and disposed transversely of supporting members 9. However, plates 31 extend outward a substantial distance beyond the supporting bed on one side only, to provide cantilever support for a single boring device for use in those operations which require work upon one side of the work piece W only. Thus, plates 31 are provided with a single guide bar 33 similar to bars 29 and adapted for sliding engagement with outer edge 15. At the end remote from the cantilevered end, plates 31 are provided with a recessed bar or tongue 35 slidably engaging under angle 19 on the other outer edge 17. In this instance, angle 19 constitutes merely a convenient outward projection of its associated supporting member 11; and in this sense, angle 19 in fact comprises the outer edge of its associated supporting member.

Work piece positioning means are provided detachably on the upper surface of each supporting plate, comprising a plurality of pairs of upright members 37, the individual components of which are perhaps best seen in Figure 7. As there shown, each guide member comprises a casting or welded angle section having a vertical leg 39 and a horizontal leg 41 braced by a diagonal web 43. Inner face 45 of guide member 37 is flat and disposed in a vertical plane parallel to the longitudinal extent of the machine as a whole and terminates upwardly in a beveled upper edge 47. Inner face 45 is provided with a plurality of horizontal, vertically spaced, rectangular grooves 49 through which extend holes 51 through vertical leg 39. Vertical holes 53 are provided through horizontal leg 41 and are adapted to register with corresponding holes 55 formed in though not necessarily through supporting plates 21. Holes 55 are provided for each member of each pair of guide members 37; and the holes corresponding to one of each pair of guide members may be duplicated lengthwise of supporting plates 21 to provide for adjustment of one of each pair of guide members 37 toward or away from the other longitudinally of the supporting plates. Fastening means for fastening guide members 37 in any of a plurality of positions of adjustment longitudinally of supporting plates 21 are provided, comprising a plurality of fastening elements in the form of screw-threaded bolts 57.

Means for supporting the lower edge of a wooden work piece W, and for supporting the lower edge of the work piece above the upper surface of supporting plates 21 and above the machine as a whole, are provided, comprising a plurality of supporting elements in the form of hollow rectangular sleeves 59 as shown in Figure 8. Bolts 61 pass through sleeves 59 and through holes 51 in each pair of guide members 37 to maintain sleeves 59 between and supported by guide members 37 with the ends of the sleeves disposed in rectangular grooves 49 and held against rotation by the ends of the grooves. The assembly of sleeves 59 and bolts 61 is shown in Figure 4 in connection with the end stop means in which sleeves 59 also find utility as will be explained later.

Each supporting plate 21 is provided with a hole 63 located above the space between spaced apart supporting members 9, for the passage of chips and wood shavings removed from the wooden work piece W. It is usually desirable to employ two pairs of guide members 37 on each supporting plate 21, one pair adjacent each lateral side of the central portion of plate 21; and when this is the case, then the hole 63 will be positioned roughly in the center of the square to receive chips and shavings from the tools of the woodworking devices located between the pairs of guide members.

Thus, it will be seen that the individual components of each pair of guide members 37 may be more or less widely spaced according to the selection of holes 55 through which bolts 57 are passed, and that the vertical height of the work piece may be regulated by the selection of the pairs of opposed grooves 49 in which the sleeves 59 are located. For this purpose, the sets of holes 55 may be spaced at standard distances corresponding to the anticipated thicknesses of the work pieces W; and the grooves 49 may be vertically spaced at distances corresponding to the anticipated width of work pieces W.

Means for mounting a woodworking device on supporting plates 21 are provided endwise outwardly of guide members 37, comprising supporting blocks 65 mounted on the upper surface of supporting plates 21. Blocks 65 support the rotary tools of the woodworking devices, in this case combined boring and routing heads 67 mounted on spindles or drive shafts 69 and advanced or retracted by double-acting fluid pressure cylinder and piston assemblies 71. Each piston assembly 71 is provided with a single pressure fluid conduit 73 through which the pressure fluid reversibly flows to advance or retract the head 67. The fluid is in turn supplied from a double-acting fluid motor 75 provided with an advancing fluid pressure line 77 and a withdrawing fluid pressure line 79 for respectively advancing and withdrawing head 67. Shaft 69, and with it head 67, is rotated by a conventional electric motor 81 provided with conventional wiring connections (not shown). In addition, holes 83 are provided in the endwise outward portions of support plates 21 for the reception of the bolts by which the motors 81 are fastened down; and it is intended that the term "means mounted on the upper surface of each supporting plate endwise outwardly of the work piece positioning means for mounting a woodworking device on a supporting plate" shall include not only block 65, but also the portions of the supporting plates containing holes 83 and such other structure associated with the supporting plates as may be employed for the mounting of the woodworking devices.

End stop means adapted to engage with the end of the work piece W to position the work piece longitudinally of the machine are provided at 85, as best seen in Figures 4, 9 and 11, and comprise a pair of upright, opposed members 87 adapted to be detachably mounted on upper surfaces 11 of supporting members 9 in opposed relationship in pairs on either side of the space between the spaced apart supporting members 9. Each member 87 is made up of a vertical leg 89 and a horizontal leg 91; and vertical leg 89 is provided with an overhanging portion 92 beneath which supporting plates 21 may be slid so as to enable positioning of end stop means 85 as nearly laterally in line with the woodworking devices as may be desired. Legs 89 and 91 are braced by a diagonal web 93. Inner face 95 is flat and disposed in a vertical plane parallel to the longitudinal extent of the machine as a whole and terminates upwardly in a beveled upper edge 97. Cut in inner face 95 is a plurality of vertical, upwardly opening rectangular grooves 99 which are spaced apart longitudinally of the longitudinal extent of the machine. Horizontal legs 91 are provided with a plurality of holes 101 therethrough adapted to register with complementary holes 103 in upper surfaces 11 of supporting members 9; and screw-threaded bolts 104 pass through holes 101 and 103 to detachably secure end stop means 85 in any of a plurality of positions of adjustment longitudinally of the machine as a whole.

End stop blocks 105, as best seen in Figure 11, are provided with rectangular tongues 107 at either end thereof adapted to slide in and rest on the bottom of vertical grooves 99 to be supported on and between opposed pairs of opposed members 87, in the manner shown in Figure 4. It will be apparent that blocks 105 may be simply dropped into and lifted out of opposed pairs of grooves 99. Members 87 are also provided with a plurality of horizontal, vertically spaced rectangular grooves opening endwise and having in their bottoms holes 111 passing through vertical legs 89 for the reception of further sleeves 59 and bolts 61 to support the lower edge of an end of the work piece W, as shown in Figure 4.

The spacing between grooves 99 in a given member 87 may correspond to standard variations in lengths of work pieces; and holes 103 may be spaced apart longitudinally of supporting members 9 by standard differential increments of work piece lengths.

The embodiment of guide member 37 shown in Figure 10 differs from that shown in Figure 7 in that it provides a substantially medially disposed vertical rectangular upwardly opening groove 113 in inner face 45 thereof for the reception of an end stop block 105. This embodiment also differs in the provision of holes 51 at both ends of vertically spaced grooves 49 so that a work piece W may extend in either direction from the associated end stop block. The embodiment of Figure 10 is for use intermediate the length of the machine as a whole and is particularly useful when a plurality of work pieces are in process simultaneously on a single machine.

The work pieces W slide between guide members 37 and rest by gravity on sleeves 59 and abut endwise against stop blocks 105. However, nothing prevents the work piece from riding up out of its seat during the performance of the work operation. Hence, it is desirable to have some means for holding the work piece down during operation of my invention. Moreover, it usually happens in practice that the work pieces are "crowned," that is, slightly warped so as to be arcuate on a curve of very long radius lying roughly in the planes of the major side faces of the work piece. With the work piece in the position shown in Figure 1, the crown would manifest itself in that the ends of the work piece would rest on the supports nearest the ends while the central portion of the work piece would be slightly higher and would ride free of its adjacent supports. Accordingly, a very important part of my invention comprises the provision of hold-down means 115 adapted not only to prevent the work piece from riding up in its seat, but also to exert a continuing downward pressure on the work piece to remove the crown by bending the work piece slightly so as to bring it into contact with all of its adjacent supports.

The hold-down means 115 are best seen in Figures 5 and 6 to comprise a pair of tongs 117 extending upwardly through the space between spaced apart supporting members 9. Tongs 117 are pivotally fastened together at their lower ends as at 119 for turning movement about a horizontal pivotal axis extending generally longitudinally of the machine. The mounting for the tongs includes a horizontal base plate 121 to which is attached an upright plate 123 having a hole 124 therethrough for access to the pivotal joints of the tongs from either side. The assembly of plates 123 and 121 is braced by diagonal webs 125 fastened to both. Means for actuating the tongs are provided, comprising a double-acting fluid pressure cylinder and piston assembly 127 arranged in vertical relationship and fastened to upright plate 123. Base plate 121 is provided with a U-shaped recess at 129 for the reception of the lower portion of assembly 127 so as to reduce the overall height of the hold-down means. A raising fluid pressure line 131 is connected to the lower end of assembly 127 and a lowering fluid pressure line 133 is connected to the upper end of the assembly for successively raising and lowering the tongs by inlet to one side of the piston and outlet from the other side of the piston. The piston is attached to a vertical piston rod 135 extending upwardly from assembly 127 and attached by a clevis 137 to the pivotal interconnection of tongs 117.

Each tong 117 is provided with a slot 139, the two slots lying in a vertical plane perpendicular to the horizontal pivotal axis at 119. Each slot 139 has a vertical upper portion 141 and a downwardly and inwardly inclined lower portion 143. A pin 145 rides in each slot 139; and the pins are held in fixed position parallel to the axis at 119 by being fixedly mounted at both ends between upright plate 123 and a pin mounting plate 147 spaced from upright plate 123.

Each tong 117 is provided at its upper end with an inwardly directed sharpened tooth 149 which is movably adjustable relative to its associated tong 117. For the purpose of adjustment, set screws 151 are provided on horizontal axes for advancing or permitting retraction of each tooth 149; and a set screw 153 is provided about a vertical axis in each tong for locking each tooth 149 in its adjusted position. It will thus be seen that by manipulation of set screws 151 and 153, the bite of the tongs may be quickly and easily adjusted.

Angles 7 are provided with a plurality of holes 155 adapted to register with corresponding holes through base plate 121 for the reception of fastening elements 157. Hold-down means 115 may thus be secured to the machine as a whole and may be shifted longitudinally of the machine by selection of any of a plurality of appropriate holes 155 longitudinally of angles 7.

The operation of the hold-down means is first to close the tongs so that teeth 149 bite into the wooden work piece, and then to lower the tongs bodily together as a unit so as to pull down on the work piece and remove the crown, at the same time holding the work piece steady against misalignment during the work operation. Thus, it will be seen that when the tongs are in their uppermost position, pins 145 will be in the lowermost portion of slots 139 and that the tongs will therefore be open. After the insertion of a work piece, cylinder and piston assembly 127 may be actuated to lower the tongs. As pins 145 ride upwardly through lower portion 143 of slots 139, it is clear from an inspection of Figure 5 that the tongs will be brought together so that teeth 149 bite into the work piece a depth predetermined by the set screws 151 and 153. Thereafter, pins 145 will ride in vertical portions 141 of slots 139; and the tongs will be lowered together as a unit without relative motion. Upon reversal of assembly 127, the tongs will first be raised while still gripping the workpiece, to relieve the downward pressure on the work piece. Thereafter, the tongs will be opened to release the work piece entirely. It is apparent that if the tongs were opened while downward pressure was still being exerted on the work piece, the work piece would spring up and the teeth 149 would scratch and mar the side faces of the work piece. Thus, the purpose of the compound movement of the tongs of my novel hold-down means 115 will be apparent.

It will also be apparent that the novel hold-down means of my invention will be effective to align or level the work pieces with great accuracy, thus permitting the performance of multiple woodworking operations with a high degree of exactitude. In those instances when the operation comprises boring, the resulting holes will be precisely located, with the result that duplicate work pieces may be freely interchanged. Needless to say, this ready interchangeability of work pieces conduces greatly to the mass production of units, such as composite trusses, in which the work pieces are assembled.

It often happens, as in composite truss design, that a curve or camber must be deliberately produced in the work piece. In practice, the degree of curve or camber is specified; and great difficulty has arisen in the past in attempting to impart the desired camber to the workpiece. My invention, and particularly my novel hold-down means, provides for the first time a solution to this problem; for by positioning the sleeves 59 in selected grooves 49, the work piece may if desired be deliberately bent. For example, the sleeves 59 medially of the length of the work piece may be placed in upper grooves 49, while those adjacent the ends of the work piece may be placed in lower grooves 49, it being necessary only that hold-down devices be positioned on both sides of the higher sleeves end-wise outwardly of the work piece. In this instance, upon actuation of the hold-down means, the work piece would be bent crown up.

Work pieces may be fed to and removed from the machine manually, or they may be handled by an endless chain conveyor passing between tongs 117, or disposed overhead; or they may be fed from overhead magazines or introduced or removed by various other mechanical devices.

Fluid pressure means are used for actuating the various movable parts of my invention; and a suitable fluid pressure circuit is shown by way of example in the schematic circuit diagram of Figure 12. Obviously, the fluid circuit of Figure 12 is a hydraulic circuit; but it will be appreciated that a compressed air circuit is equally effective. Hence, the term "fluid pressure" includes both hydraulic and compressed air systems as well as other analogous fluid systems. Figure 12 shows a supply tank 159 feeding by a feed pipe conduit 161 to a pump 163 having on its outlet side an outlet conduit 165 leading to a variably operable pressure release valve 167 which in turn leads by one line to a valve bank 169 and by a seepage, bypass or return conduit 171 back to tank 159. Valve bank 169 includes three two-way valves 173, 175 and 177, for the actuation of certain tool heads, for the actuation of the hold-down means, and for the actuation of certain other tool heads, respectively. In addition, the controls at the control station comprising the location of valve bank 169 include a start-stop switch 179 by which the electric motors 181 may be controlled.

The operation of my invention is as follows:

According to the length of the work piece, coarse adjustment of end stop means 85 is made by bodily positioning a pair of opposed members 87 longitudinally of the machine by selection of appropriate holes 103. In practice, end stop means 85 need be provided only adjacent a single end of the work piece. Fine adjustment of end stop means 85 is then made by dropping end stop block 105 in an appropriate opposed pair of grooves 99.

Adjustment according to the thickness of the work piece is made by bodily positioning one of a pair of guide members 37 longitudinally of a supporting plate 21 by selection of appropriate holes 55.

Adjustment according to the width of the work piece or according to the desired location of the work operation laterally of the work piece is made by selection of appropriate set of sleeves 59 and bolts 61 of the proper length and by positioning this assembly 59, 61 in an appropriately vertically spaced pair of opposed grooves 49.

Adjustment according to the location of the work operation longitudinally of the work piece is made by sliding supporting plates 21 longitudinally of the supporting bed and locating plates 21 by selection of appropriate holes 13. Holddown means 115 are then spaced between plates 21 and teeth 149 set for the proper bite.

The machine is now set for the indefinite repetition of a particular set of work operations on a plurality of work pieces of given dimensions. With the tongs open, the wooden work piece W is slipped down between the guide members 37 to rest on sleeves 59 and abut endwise against end stop block 105; and in this position, it is positioned on edge, disposed in a centrally vertical plane, crown up, above the space between spaced apart suporting members 9.

Valve 175 is moved one way to send pressure fluid through line 133 to close and lower tongs 117 and thus clamp the work piece in position and remove the crown. Switch 179 is actuated to commence rotation of the tools. Valve 173 is actuated one way to send pressure fluid into lines 77 on one side of the machine to advance the work heads 67 toward and into contact with the work piece on that side of the machine. Valve 173 is then moved the other way to send pressure fluid into lines 79 on that side of the machine to withdraw the work heads 67 from that side. Then, valve 177 is moved one way to send pressure fluid into the lines 77 on the other side of the machine to advance the heads 67 on that other side of the machine, followed by movement of valve 177 in the other direction to send pressure fluid into lines 79 on the other side of the machine to withdraw heads 67 from that other side. Finally, valve 175 is moved the other way to send pressure fluid into line 131 to raise and then open tongs 117 to release pressure on the work piece and to free the work piece, successively. The work piece may then be lifted out of its seat and replaced by another work piece and the foregoing operation repeated.

In addition to the manuipulations at the control station, the only manual labor involved is the insertion and withdrawal of work pieces. These steps may be accomplished in only a few seconds, with the result that by far the greatest part of the operating time is consumed by the actual woodworking operation; that is, heads 67 are in contact with the work piece, on one side or the other, during by far the greatest part of the operating time. Hence, it will be apparent that the operation of my invention is extremely efficient from a time-motion standpoint. It will also be apparent that my invention is easily operable by unskilled labor. Finally, it will be apparent that the accuracy of woodworking operation obtainable by use of my invention is far greater than any heretofore obtainable by anything short of the most painstaking and time-consuming efforts of skilled craftsmen.

Thus, it will be obvious that I have achieved all of the initially recited objects of my invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A woodworking machine comprising in combination, a pair of spaced-apart, horizontal, parallel supporting members having their upper surfaces disposed in a common horizontal plane, means slidably mounted on said supporting members for supporting a woodworking device, means mounted on said machine for positioning a wooden work piece above the space between said spaced-apart supporting members, and end stop means mounted on said supporting members and adapted to engage an end of said work piece to locate said work piece longitudinally of said supporting members, said end stop means having a pair of upright opposed members, one mounted on the upper surface of each said supporting member, and an end stop block mounted on and disposed between said opposed members.

2. In a woodworking machine, in combination, a pair of spaced-apart, horizontal, parallel supporting members having their upper surfaces disposed in a common horizontal plane, and end stop means mounted on said supporting members and adapted to engage an end of a wooden work piece to locate said work piece longitudinally of said supporting members, said end stop means comprising a pair of upright opposed members, one mounted on the upper surface of each said supporting member, and an end stop block mounted on and disposed between said opposed members.

3. The invention of claim 2, said opposed members having a pair of opposed, vertical, upwardly opening grooves in which the ends of said end stop block are receivable.

4. The invention of claim 3, there being a plurality of pairs of said grooves, said pairs being spaced-apart longitudinally of said supporting members.

5. A horizontal wood boring machine adapted to support a plurality of wood boring devices movable in parallelism thereon, comprising in combination a pair of spaced-apart, horizontal, parallel supporting members having their upper surfaces disposed in a common horizontal plane, a plurality of elongated, horizontal supporting plates disposed transversely of said supporting members, each said supporting plate being mounted on both said supporting members for sliding movement longitudinally of said supporting members, means mounted on said machine adapted to contact a wooden work piece to position said work piece above the space between said spaced-apart supporting members, and means mounted on each said supporting plate for mounting a said boring device on a said supporting plate, at least one said supporting plate having means at one end slidably engaging under the outer edge of one said supporting member, and at the other end extending outward a substantial distance beyond the outer edge of the other said supporting member to provide cantilever support for a single said boring device.

6. A horizontal wood boring machine adapted to support a plurality of wood boring devices movable in parallelism thereon, comprising in combination a pair of spaced-apart, horizontal, parallel supporting members having their upper surfaces disposed in a common horizontal plane, a plurality of elongated, horizontal supporting plates disposed transversely of said supporting members, each said supporting plate being mounted on both said supporting members for sliding movement longitudinally of said supporting members, means mounted on said machine adapted to contact a wooden work piece to position said work piece above the space between said spaced-apart supporting members, and means mounted on each said supporting plate for mounting a said boring device on a said supporting plate, at least one said supporting plate extending outward a substantial distance beyond the outer edges of said supporting members on both sides of said supporting members to provide balanced support for an opposed pair of said boring devices.

7. A woodworking machine including at least one woodworking device and comprising an elongated, horizontal supporting bed, means for positioning a wooden work piece endwise longitudinally of said bed, an elongated, horizontal supporting plate mounted transversely for sliding movement on said supporting bed, means for locking said supporting plate in any of a plurality of positions of adjustment longitudinally of said supporting bed, means mounted on said supporting plate for supporting and laterally positioning a said work piece, and means mounted on said supporting plate endwise outwardly of said work piece supporting and positioning means for mounting a said woodworking device on said supporting plate, said supporting plate having means at one end slidably engaging under one outer edge of said supporting bed, said supporting plate at the other end extending outward a substantial distance beyond the other outer edge of said supporting bed to provide cantilever support for a single said woodworking device.

8. A woodworking machine including at least one woodworking device and comprising an elongated, horizontal supporting bed, means for positioning a wooden work piece endwise longitudinally of said bed, an elongated, horizontal supporting plate mounted transversely for sliding movement on said supporting bed, means for locking said supporting plate in any of a plurality of positions of adjustment longitudinally of said supporting bed, means mounted on said supporting plate for supporting and laterally positioning a said work piece, and means mounted on said supporting plate endwise outwardly of said work piece supporting and positioning means for mounting a said woodworking device on said supporting plate, said supporting plate extending outward a substantial distance beyond both outer edges of said supporting bed on both sides of said supporting bed to provide balanced support for an opposed pair of said woodworking devices.

9. A horixontal wood boring machine adapted to support a plurality of wood boring devices movable in parallelism thereon, comprising in combination a pair of spaced-apart, horizontal, parallel supporting members having their upper surfaces disposed in a common horizontal plane, a plurality of elongated, horizontal supporting plates disposed transversely of said supporting members, each said supporting plate being mounted on both said supporting members for sliding movement longitudinally of said supporting members, means mounted on the upper surface of each said supporting plate adapted to contact the sides of a wooden work piece to position said work piece above the space between said spaced-apart supporting members, said work piece positioning means comprising a pair of upright guide members spaced apart longitudinally of said supporting plate, means mounted on the upper surface of each said supporting plate endwise outwardly of said work piece positioning means for mounting a said boring device on a said supporting plate, and means for supporting the lower edge of said work piece above the upper surface of each said supporting plate comprising a plurality of supporting elements, one mounted on and disposed between each said pair of guide members.

10. The invention of claim 9, in which each said supporting element comprises a hollow rectangular sleeve supported on a bolt passing through and joining a said pair of guide members.

11. The invention of claim 10, in which the ends of said sleeve are received in a pair of opposed, horizontal grooves in said pair of guide members.

12. The invention of claim 11, there being a plurality of pairs of said horizontal grooves, said pairs of grooves being vertically spaced apart.

13. A woodworking machine including a woodworking device and comprising an elongated, horizontal supporting plate, means mounted on said supporting plate for supporting and laterally positioning a wooden work piece, said means comprising a pair of upright guide members spaced apart longitudinally of said supporting plate and a supporting element mounted on and disposed between said pair of guide members and spaced above said supporting plate, said supporting element comprising a hollow rectangular sleeve supported on a bolt passing through and joining said pair of guide members, the ends of said sleeve being received in a pair of opposed, horizontal grooves in said pair of guide members, and means mounted on said supporting plate endwise outwardly of said work piece supporting and positioning means for mounting a said woodworking device on said supporting plate.

14. A woodworking machine including a woodworking device and comprising means mounted on said machine for supporting and laterally positioning a wooden work piece, said means comprising a pair of spaced-apart, upright guide members mounted on said machine, and a supporting element mounted on and disposed between said pair of guide members, said supporting element comprising a hollow rectangular sleeve supported on a bolt passing through and joining said pair of guide members.

15. The invention of claim 14, in which the ends of said sleeve are received in a pair of opposed, horizontal grooves in said pair of guide members.

16. The invention of claim 15, there being a plurality of pairs of said horizontal grooves, said pairs of grooves being vertically spaced apart.

17. A horizontal wood boring machine adapted to support a plurality of wood boring devices movable in parallelism thereon, comprising in combination a pair of spaced-apart, horizontal, parallel supporting members having their upper surfaces disposed in a common horizontal plane, a plurality of elongated, horizontal supporting plates disposed transversely of said supporting members, each said supporting plate being mounted on both said supporting members for sliding movement longitudinally of said supporting members, means mounted on said machine adapted to contact a wooden work piece to position said work piece above the space between said spaced-apart supporting members, means mounted on each said supporting plate for mounting a said boring device on a said supporting plate, and hold-down means mounted on said machine and adapted to exert downward pressure on said work piece, said hold-down means comprising a pair of tongs extending up through the space between said spaced-apart supporting members and adapted to engage with opposite side faces of said work piece to grip and hold said work piece against movement.

18. The invention of claim 17, and means for closing and opening said tongs to successively grip and release said work piece, and means for lowering and raising said tongs when in closed position to successively apply and release downward pressure on said work piece.

19. In a woodworking machine, in combination, a pair of spaced-apart, horizontal, parallel supporting members having their upper surfaces disposed in a common horizontal plane, means mounted on said supporting members for supporting a wooden work piece in horizontal position above the space between said spaced-apart supporting members, means mounted on said supporting members for supporting at least one woodworking device in operative relation to said work piece, and hold-down means mounted on said machine and adapted to exert downward pressure on said work piece, said hold-down means comprising a pair of tongs extending up through the space between said spaced-apart supporting members and adapted to engage with opposite side faces of said work piece to grip and hold said work piece against movement.

20. The invention of claim 19, and means for closing and opening said tongs to successively grip and release said work piece, and means for lowering and raising said tongs when in closed position to successively apply and release downward pressure on said work piece.

21. In a woodworking machine, means for supporting a wooden work piece on said machine, hold-down means mounted on said machine and comprising an upwardly extending pair of tongs, and fluid pressure means operable successively to close and lower said tongs to clamp said work piece against said supporting means and to raise and open said tongs to release said work piece.

22. The invention of claim 21, in which the upper ends of said tongs are provided each with an inwardly directed, sharpened tooth adapted to bite into an adjacent side of said wooden work piece, said teeth being movably adjustable relative to said tongs to vary the bite of said teeth.

23. The invention of claim 21, said tongs being pivotally interconnected about a horizontal axis, each of said tongs having a slot therein having a vertical upper portion and a downwardly and inwardly inclined lower portion, said slots lying in a plane perpendicular to said axis, and a pair of pins fixedly mounted on said machine parallel to said axis and disposed one in each of said slots, said fluid pressure means operating reversibly vertically to raise and lower said tongs when said pins are in said upper portions of said slots and to open and close said tongs when said pins are in said lower portions of said slots.

References Cited in the file of this patent

UNITED STATES PATENTS

| | | |
|---|---|---|
| 394,879 | Phillips | Dec. 18, 1888 |
| 396,298 | Schofield | Jan. 15, 1889 |
| 491,493 | Rebhun | Feb. 7, 1893 |
| 620,614 | Rockwell | Mar. 7, 1899 |
| 1,011,108 | Bowman | Dec. 5, 1911 |
| 1,518,709 | Thomas | Dec. 9, 1924 |
| 1,578,898 | Littleford | Mar. 30, 1926 |
| 1,769,511 | Heston et al. | July 1, 1930 |
| 2,471,103 | Franks | May 24, 1949 |
| 2,570,845 | Ottersland | Oct. 9, 1951 |
| 2,647,483 | Price | Aug. 4, 1953 |
| 2,682,899 | Miller | July 6, 1954 |